United States Patent [19]

McDonald

[11] 3,799,573

[45] Mar. 26, 1974

[54] VEHICLE BODY OCCUPANT RESTRAINT CUSHION SYSTEM

[75] Inventor: Patrick G. McDonald, Pontiac, Mich.

[73] Assignee: General Motors Corporation, Detroit, Mich.

[22] Filed: Dec. 13, 1971

[21] Appl. No.: 207,061

Related U.S. Application Data

[63] Continuation-in-part of Ser. No. 70,320, Sept. 8, 1970, abandoned.

[52] U.S. Cl............................ 280/150 AB, 137/525
[51] Int. Cl............................................ B60r 21/08
[58] Field of Search..... 280/150 AB; 222/3; 9/11 A, 9/302, 310 F

[56] References Cited
UNITED STATES PATENTS

| 3,586,347 | 6/1971 | Carey............................ 280/150 AB |
| 3,564,845 | 2/1971 | Friedman.......................... 137/68 X |
| 3,142,850 | 8/1964 | Boer.................................. 222/3 X |
| 3,632,132 | 1/1972 | Richardson.................. 280/150 AB |
| 3,642,303 | 2/1972 | Irish et al. .................... 280/150 AB |
| 3,632,135 | 1/1972 | Chute........................... 280/150 AB |

*Primary Examiner*—David Schonberg
*Assistant Examiner*—John P. Silverstrim
*Attorney, Agent, or Firm*—Herbert Furman

[57] ABSTRACT

A vehicle body includes an instrument panel, a source of pressure fluid releasable upon the body receiving an acceleration pulse of predetermined amplitude and time, an occupant restraint cushion secured to the instrument panel within a recess thereof in a deflated folded condition, and a releasable covering over the folded cushion. A normally collapsed diffuser tube fits within the cushion and between the folded portion of the cushion and the instrument panel. The tube is connected to the pressure fluid source. The wall of the diffuser tube includes either a plurality of slits normally closed in the collapsed condition of the tube, or a plurality of openings. Upon release of the pressure fluid, the diffuser tube expands and forces the folded portion of the cushion as a unit away from the instrument panel to forcibly release the covering. The slits, which open when the tube expands, or the openings, then inflate the cushion from the pressure fluid source.

2 Claims, 6 Drawing Figures

PATENTED MAR 26 1974 3,799,573

INVENTOR.
Patrick G. McDonald
BY
Herbert Furman
ATTORNEY

VEHICLE BODY OCCUPANT RESTRAINT CUSHION SYSTEM

This application is a continuation-in-part of copending application Ser. No. 70,320, filed Sept. 8, 1970, now abandoned.

This invention relates generally to vehicle body occupant restraint cushion systems and more particularly to an improved diffuser member for use in such systems.

Such systems conventionally include a source of pressure fluid such as pressure vessel sealed by a rupturable seal, a sensor for sensing impact of the vehicle with an obstacle and for rupturing the pressure vessel seal when an impact of predetermined magnitude occurs, a normally deflated folded cushion mounted on the instrument panel or other body interior surface presentable to a vehicle occupant, and a conduit arrangement including a manifold and a slotted diffuser tube for communicating the pressure vessel with the interior of the cushion to inflate the cushion when necessary. The cushion is either covered by a releasable scored flexible covering or by some type of releasable more rigid covering which is released by inflation of the cushion.

The system of this invention differs from such conventional systems in that the diffuser member or tube is formed of woven fabric material or semi-rigid plastic material and is normally collapsed upon itself. The diffuser member fits between the deflated folded cushion and the instrument panel and communicates with the manifold. The wall of the diffuser member may include a series of slits which are normally closed when the diffuser member is collapsed. The slits may be covered by a rupture seal coating. Alternatively, the diffuser member may include a plurality of openings, or a combination of slits and openings.

When the appropriate signal is received by the sensor and the pressure fluid is released, the diffuser member is expanded. This forces the deflated folded cushion away from the instrument panel as a unit and ruptures or releases the covering. Since the force on the releasable covering is applied by the cushion when folded and deflated, the cushion can be made of extremely light-weight material without fear of rupture when it releases the covering. Upon expansion of the diffuser tube, the cushion is thereupon inflated, either from the slits, which open upon expansion of the diffuser tube, or from the openings, or both.

The diffuser member can therefore be formed of heavy walled material and the cushion of light-weight material. The diffuser member can be rapidly expanded to impose a high velocity and a large force to the deflated folded cushion to thereby release the covering while not subjecting the cushion to any large stresses.

Since the diffuser member is normally collapsed upon itself, the overall stack height of the diffuser member and the folded cushion is much less than if the diffuser member were not collapsed in its normal inoperative condition. This allows the diffuser member and cushion to be mounted within a body recess which is as shallow as possible and still not project beyond the normal surface of the body structure containing such recess.

One object of this invention is to provide an occupant restraint system of a vehicle body with an improved diffuser member which is normally in a collapsed condition and which is expanded from the collapsed condition to annular shape upon communication with a pressure fluid source, a plurality of openings in the wall of the diffuser member providing flow of pressure fluid from the diffuser member to a normally folded occupant restraint cushion to inflate such cushion. Another object of this invention is to provide an occupant restraint system of a vehicle body with an improved diffuser member which is expanded from a normally collapsed condition upon receipt of pressure fluid internally thereof to thereby forcibly move a restraint cushion in a folded condition relative to a vehicle body support surface to release a covering for the cushion without subjecting the cushion to any large stresses.

A further object of this invention is to provide an occupant restraint system of a vehicle body with an improved diffuser member for inflating an occupant restraint cushion, with the diffuser member being normally in a collapsed inoperative condition to reduce the stack height of the diffuser member and a normally folded cushion to a minimum. Yet another object of this invention is to provide an occupant restraint system of a vehicle body with an improved diffuser member having a plurality of apertures therein, with the diffuser member being normally collapsed upon itself and being expanded upon receipt of pressure fluid internally thereof from a pressure fluid source to thereby provide for transfer of the pressure fluid through the apertures to a folded occupant restraint cushion and inflate such cushion. Yet a further object is to provide such a diffuser member wherein the openings are slits in the wall of the diffuser member which are normally closed when the diffuser member is in the collapsed condition and which open upon expansion of the diffuser member.

These and other objects of the invention will be readily apparent from the following specification and drawings wherein.

Figure 1:
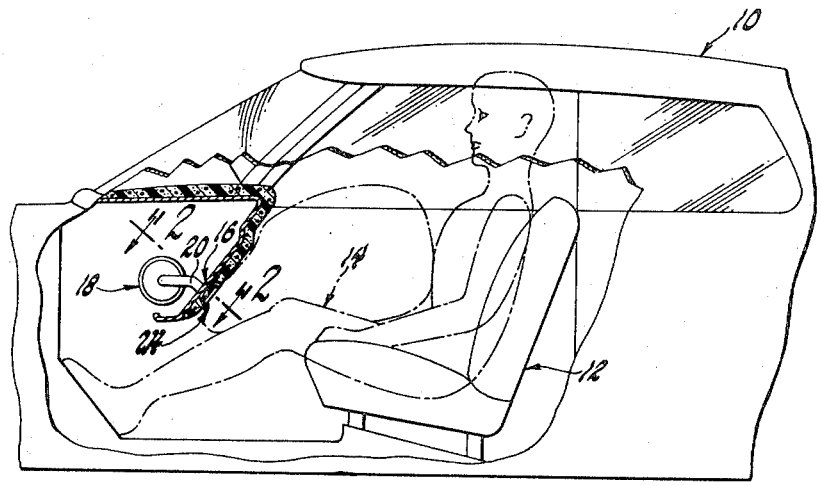
FIG. 1 is a partially broken away view of a vehicle body having an occupant restraint cushion system embodying a diffuser member according to this invention.

Referring now to the drawing, a vehicle body generally designated 10 includes a conventional front seat 12 for supporting a schematically indicated occupant 14 in seated attitude. A conventional instrument panel 16 extends laterally of the body in spaced relationship to the occupant 14. Mounted underneath the instrument panel 16 are the major components of a conventional inflatable occupant restraint system generally designated 18. Such system would generally include a pressure vessel sealed by a rupturable diaphragm, a sensor for sensing impact of the vehicle with an obstacle and a squib or other conventional means for rupturing the diaphragm and releasing the pressure fluid upon signal from the sensor. A conventional manifold 20 communicates the outlet of the pressure vessel with a normally collapsed diffuser member or tube 22 according to this invention. The diffuser tube fits within a conventional normally deflated folded cushion 24 which is secured to the instrument panel 16, as will be described, and is covered for decorative and protection purposes by a conventional covering 26 having one or more score lines, not shown. Alternatively the covering may be in the form of a more rigid plastic cover releasably secured in a conventional manner to the instrument panel 16.

The forward wall 28 of the cushion 24, with respect to the body, seats against a resilient or flexible intermediate member 30 which seats on the outer surface of the instrument panel 16. The diffuser tube 22 fits within the cushion 24 underneath the folds or pleats thereof and against the forward wall 28 of the cushion. One or more fasteners 32 project through the diffuser tube, the wall 28, the intermediate member 30 and the instrument panel 16 and are conventionally secured to the latter to mount both the cushion 24 and the diffuser tube 22 on the instrument panel. Although the cushion 24 is shown as having pleated walls, it is understood that the cushion 24 need not be pleated in the manner shown but can be folded or pleated in other manners.

Figure 2:
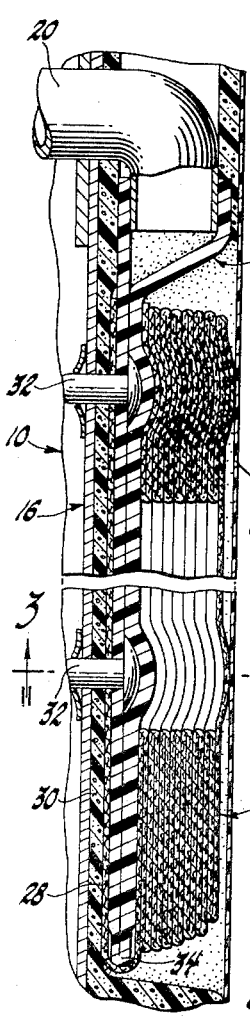
FIG. 2 is an enlarged sectional view taken generally along the plane indicated by line 2—2 of FIG. 1.

Normally the diffuser tube 22 is collapsed. The end of the tube communicating with the manifold 20 is, of course, expanded but the other or remote end 34 is sealed as shown in FIG. 2. The portion 36 of the wall of the diffuser tube facing the pleated cushion 24 is provided with two spaced longitudinal rows of slits 38, FIG. 3 through 5, which open to the interior of the cushion 24. The slits 38 may be formed in any conventional manner when the diffuser tube 22 is formed and are normally closed when the tube is collapsed. Alternatively, the wall portion 36 or the entire diffuser tube may be provided with a rupture seal coating.

Figure 5:
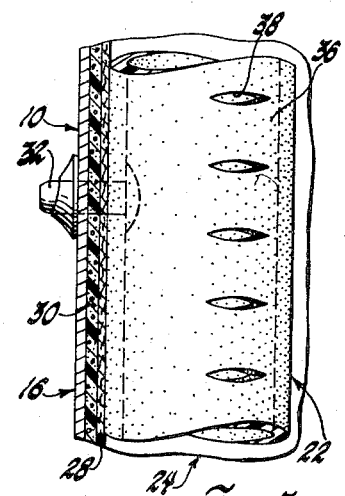
FIG. 5 is an elevational view of the expanded diffuser member.

When the sensor of the system 18 senses an impact of the vehicle with an obstacle of predetermined magnitude and the fluid within the pressure vessel is released, the fluid will pass through the manifold 20 and into the diffuser tube 22. The diffuser tube 22 will thereupon expand to its cylindrical shape as shown in FIGS. 4 and 5. During this expansion, the openings 38 remain closed, and this will force or move the folded cushion 24 outwardly relative to the instrument panel 16 or upwardly as viewed in FIGS. 2 and 3 to thereby release the covering 26. When the diffuser tube is expanded as shown in FIGS. 4 and 5, the slits 38 open as shown in FIG. 5 to release the pressure fluid from the manifold 20 to the interior of the cushion 24 and thereupon inflate the cushion.

Since the rupture of the covering 26 occurs while the cushion 24 is folded, the cushion may be made of very lightweight material and still be capable of receiving a large force from the diffuser tube to rupture the covering without fear of rupturing the cushion. It can be seen from the drawings that the walls of the diffuser tube are relatively heavy or thick compared to the thickness of the material of the cushion 24. However, the cushion can still receive a high initial velocity and a large force from the diffuser tube upon expansion thereof, due to the fact that the cushion is receiving such velocity and force in its folded or tightly packed state. The covering 26 is easily released by the cushion since the cushion is applying the force prior to inflation thereof so that it is not being subjected to inflation stress during release of the covering.

Figure 3:
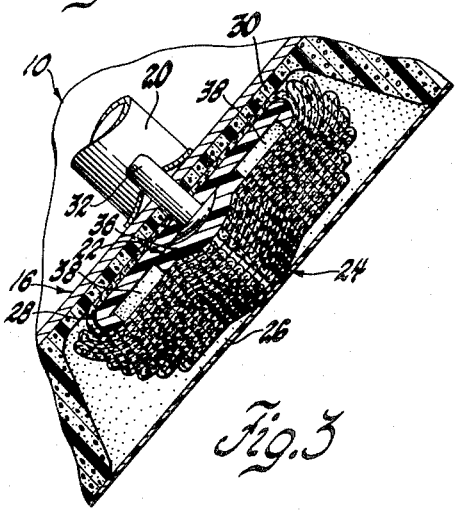
FIG. 3 is a sectional view taken generally along the plane indicated by line 3—3 of FIG. 2.
Figure 4:
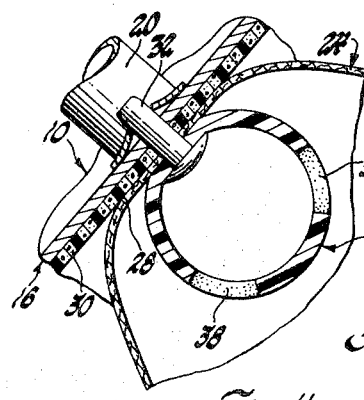
FIG. 4 is a view similar to FIG. 3 showing the cushion being inflated from the expanded diffuser member.
Figure 6:
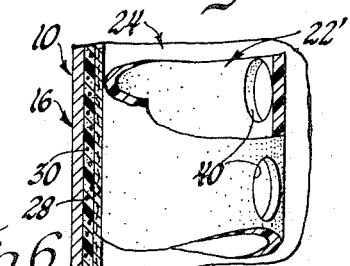
FIG. 6 is an elevational view of an expanded diffuser member similar to FIG. 5 and showing another embodiment of the invention.

FIG. 6 is a view of an expanded diffuser member 22' which is the same as that shown in FIGS. 3 through 5 except that the diffuser member 22' includes a plurality of circular openings 40. The openings 40 are, of course, not closed when the diffuser member is collapsed upon itself as shown in FIGS. 2 and 3. It should also be noted, of course, that the diffuser member may be provided with a combination of the slits 38 and the openings 40.

With reference to FIGS. 2 and 3 of the drawings, it can be seen that the intermediate member 30 provides the bottom wall of a recess in the instrument panel 16 and that the collapsed diffuser tube 22 permits both the diffuser tube and the folded cushion 24 to be mounted in a relatively shallow recess since the collapsed diffuser tube and folded cushion reduce the stack height to the minimum. The recess is shown as having a trapezoidal cross section for ease of exit of the cushion 24 upon inflation thereof.

Thus, this invention provides an improved vehicle body occupant restraint cushion system.

I claim:

1. In combination with a vehicle body having a support, a source of pressure fluid, means for releasing the pressure fluid from the source upon impact of the body with an obstacle, an occupant restraint cushion mounted on the support in a deflated folded condition, and forcibly releasable means covering the folded cushion, the improvement comprising, a normally collapsed annular diffuser member mounted on the support and having a portion of the wall thereof provided with a plurality of apertures, the folded cushion seating on the wall portion over the apertures to communicate the cushion with the diffuser member, means internally communicating the diffuser member with the pressure fluid source, release of the pressure fluid from the source initiating the expansion of the diffuser member to annular shape to bodily move the folded cushion as a unit relative to the support and forcibly release the cover means, the apertures in the wall portion of the diffuser member communicating the diffuser member with the cushion as the diffuser member is inflated to initiate the inflation of the cushion.

2. In combination with a vehicle body having a support, a source of pressure fluid, means for releasing the pressure fluid from the source upon impact of the body with an obstacle, an occupant restraint cushion mounted on the support in a deflated folded condition, and forcibly releasable means covering the folded cushion, the improvement comprising, a normally collapsed annular diffuser member of flexible material mounted on the support and having a portion of the wall thereof provided with a plurality of normally closed apertures, the folded cushion seating on the wall portion over the apertures to communicate the cushion with the diffuser member, means internally communicating the diffuser member with the pressure fluid source, release of the pressure fluid from the source initiating the expansion of the diffuser member to annular shape to bodily move the folded cushion as a unit relative to the support and forcibly release the cover means, the apertures in the wall portion of the diffuser member opening as the diffuser member inflates and communicating the diffuser member with the cushion to initiate the inflation of the cushion.

* * * * *